(12) United States Patent
Mulvaney

(10) Patent No.: US 10,244,879 B1
(45) Date of Patent: Apr. 2, 2019

(54) BEVERAGE CARAFE WITH IMPROVED LIQUID FLOW

(71) Applicant: Hamilton Beach Brands, Inc., Glen Allen, VA (US)

(72) Inventor: Patrick T Mulvaney, Richmond, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 0 days.

(21) Appl. No.: 15/972,430

(22) Filed: May 7, 2018

(51) Int. Cl.
  *A47G 19/14* (2006.01)
  *A47J 31/10* (2006.01)
  *A47J 31/44* (2006.01)

(52) U.S. Cl.
  CPC ............. *A47G 19/14* (2013.01); *A47J 31/10* (2013.01); *A47J 31/4407* (2013.01)

(58) Field of Classification Search
  CPC ........ A47G 19/14; A47J 31/10; A47J 31/4407
  USPC ................................................ 222/566–574
  See application file for complete search history.

(56) References Cited

U.S. PATENT DOCUMENTS

| | | | |
|---|---|---|---|
| 1,357,629 A * | 11/1920 | Faistl | A47G 19/145 222/564 |
| 5,265,767 A * | 11/1993 | Gustafson | A47G 19/12 222/144.5 |
| 5,947,343 A * | 9/1999 | Horstmann | B65D 47/249 222/472 |
| 6,216,754 B1 * | 4/2001 | Geroult | A47G 19/14 141/21 |
| 6,431,417 B1 | 8/2002 | Kumar | |
| 9,663,286 B2 | 5/2017 | Schmertz, Jr. | |
| 2002/0053578 A1 * | 5/2002 | Iwamoto | A47J 41/0027 222/482 |
| 2008/0110899 A1 * | 5/2008 | Gustafson | A47G 19/14 220/553 |
| 2008/0185404 A1 * | 8/2008 | Schreiber-Pethan | A47G 19/14 222/470 |
| 2015/0314929 A1 | 11/2015 | Tebbe et al. | |
| 2017/0267425 A1 | 9/2017 | Stratton | |

* cited by examiner

*Primary Examiner* — Jeremy Carroll
(74) *Attorney, Agent, or Firm* — Alexander D. Raring

(57) ABSTRACT

A beverage carafe comprises a beverage reservoir and a channel for directing a flow of liquid from the reservoir when the carafe is tilted for dispensing the liquid. The channel has a floor and an elongated protrusion projecting upward from the floor. The protrusion is transverse to the flow of the liquid through the channel and has a curved distal face and curved sides.

8 Claims, 10 Drawing Sheets

BEVERAGE CARAFE WITH IMPROVED LIQUID FLOW

BACKGROUND OF THE DISCLOSURE

The present disclosure relates generally to liquid-containing vessels in general, and more specifically to carafes for storing and serving beverages.

A beverage carafe may be used to store and serve beverages. A beverage carafe may be used with, for example, a beverage brewing system such as an automatic drip coffee maker.

Beverage carafe lid outlets may be closed via a flapper door to reduce steam and heat loss from the carafe. When the carafe is upright, the flapper is closed. As the user tilts the carafe to pour the beverage, the flowing beverage and gravity lift the flapper door from its seat allowing the beverage to flow out of the lid nozzle to the carafe spout. As the beverage level decreases in the carafe, the user must increase the tilt of the carafe to keep the beverage flowing. The variable tilt of the carafe leads to undesirable fluid flow mechanics resulting in splatting, splashes and/or drips, each of which can create a mess.

It has heretofore not been discovered how to create a beverage carafe that can pour a beverage with little to no splatter and drips regardless of the angle of tilt of the carafe. The beverage carafe of the following disclosure overcomes at least one of the above-described disadvantages of conventional beverage carafes.

BRIEF SUMMARY OF THE DISCLOSURE

A beverage carafe is disclosed herein. In one embodiment of the subject device, a beverage carafe comprises a beverage reservoir and a channel for directing a flow of liquid from the reservoir when the carafe is tilted for dispensing the liquid. The channel has a floor and an elongated protrusion projecting upward from the floor. The protrusion is transverse to the flow of the liquid through the channel and has a curved distal face and curved sides.

The beverage carafe may further comprise a pour spout, such that the channel directs the flow of the liquid from the reservoir to the pour spout.

The beverage carafe may further comprise a selectively removable lid for selectively closing off an open top end of the reservoir, such that the channel is defined in the lid.

The beverage carafe may further comprise a throat positioned such that the liquid flows from the reservoir through the throat to the channel, and a flapper that pivots between a down position in which the throat is at least partly closed off and an up position for dispensing. The flapper may have a concave bottom surface to direct the flow of the liquid toward the channel. The throat may have opposing flat side edges such that opposing vent openings are defined between the concave bottom surface of the flapper and the flat side edges of the throat when the flapper is in the down position.

In alternative embodiments of the present disclosure, a beverage carafe comprises a beverage reservoir, a channel for directing a flow of liquid from the reservoir when the carafe is tilted for dispensing the liquid, a throat positioned such that the liquid flows from the reservoir through the throat to the channel, and a flapper that pivots between a down position in which the throat is at least partly closed off and an up position for dispensing. The flapper can comprise a concave bottom surface to direct the flow of the liquid toward the channel.

The throat may have opposing flat side edges such that opposing vent openings are defined between the concave bottom surface of the flapper and the flat side edges of the throat when the flapper is in the down position.

The channel may have a floor and an elongated protrusion projecting upward from the floor. The protrusion is transverse to the flow of the liquid through the channel and has a curved distal face and curved sides.

BRIEF DESCRIPTION OF THE SEVERAL VIEWS OF THE DRAWINGS

The foregoing summary, as well as the following detailed description of the disclosure, will be better understood when read in conjunction with the appended drawings. For the purpose of illustrating the disclosure, there are shown in the drawings embodiments which are presently preferred. It should be understood, however, that the disclosure is not limited to the precise arrangements and instrumentalities shown. In the drawings.

DETAILED DESCRIPTION OF THE DISCLOSURE

Figure 1:
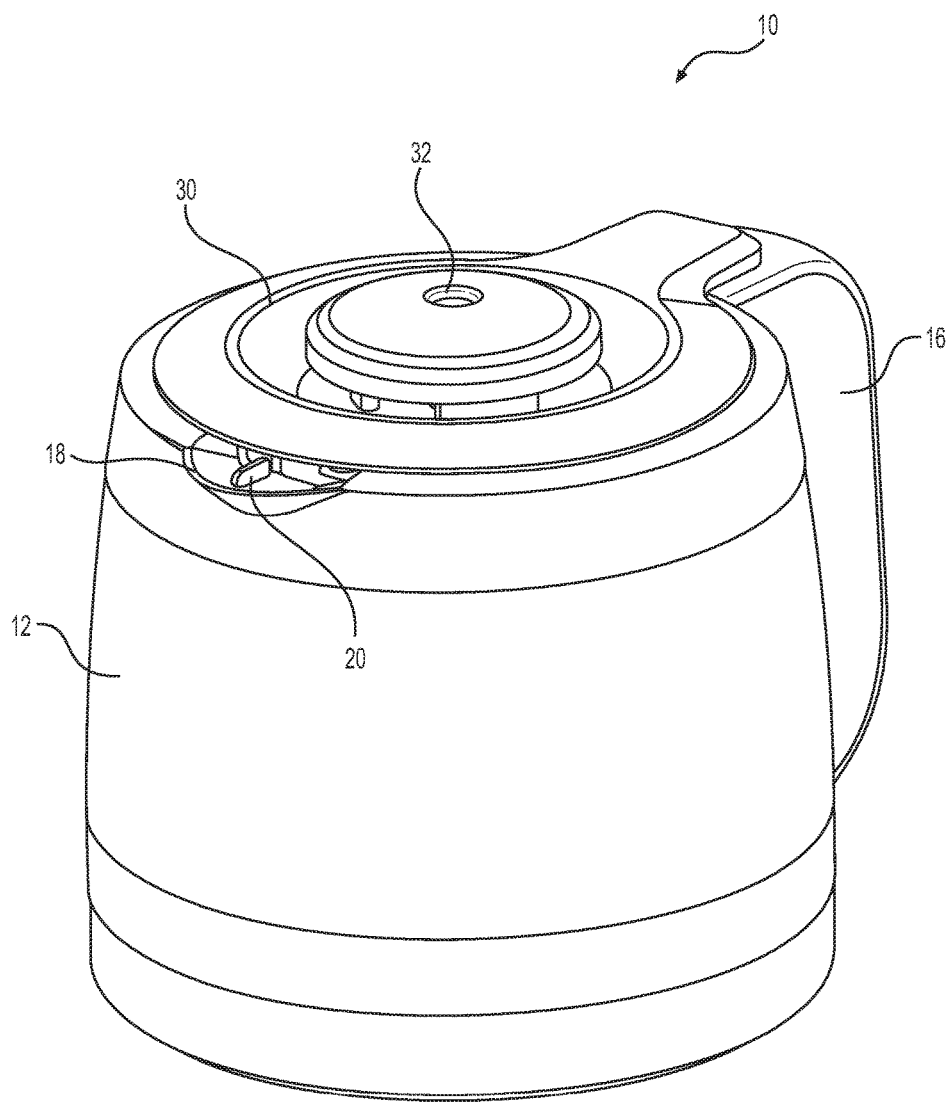
FIG. 1 is a perspective view of a beverage carafe, according to one embodiment of the present disclosure.
Figure 2:
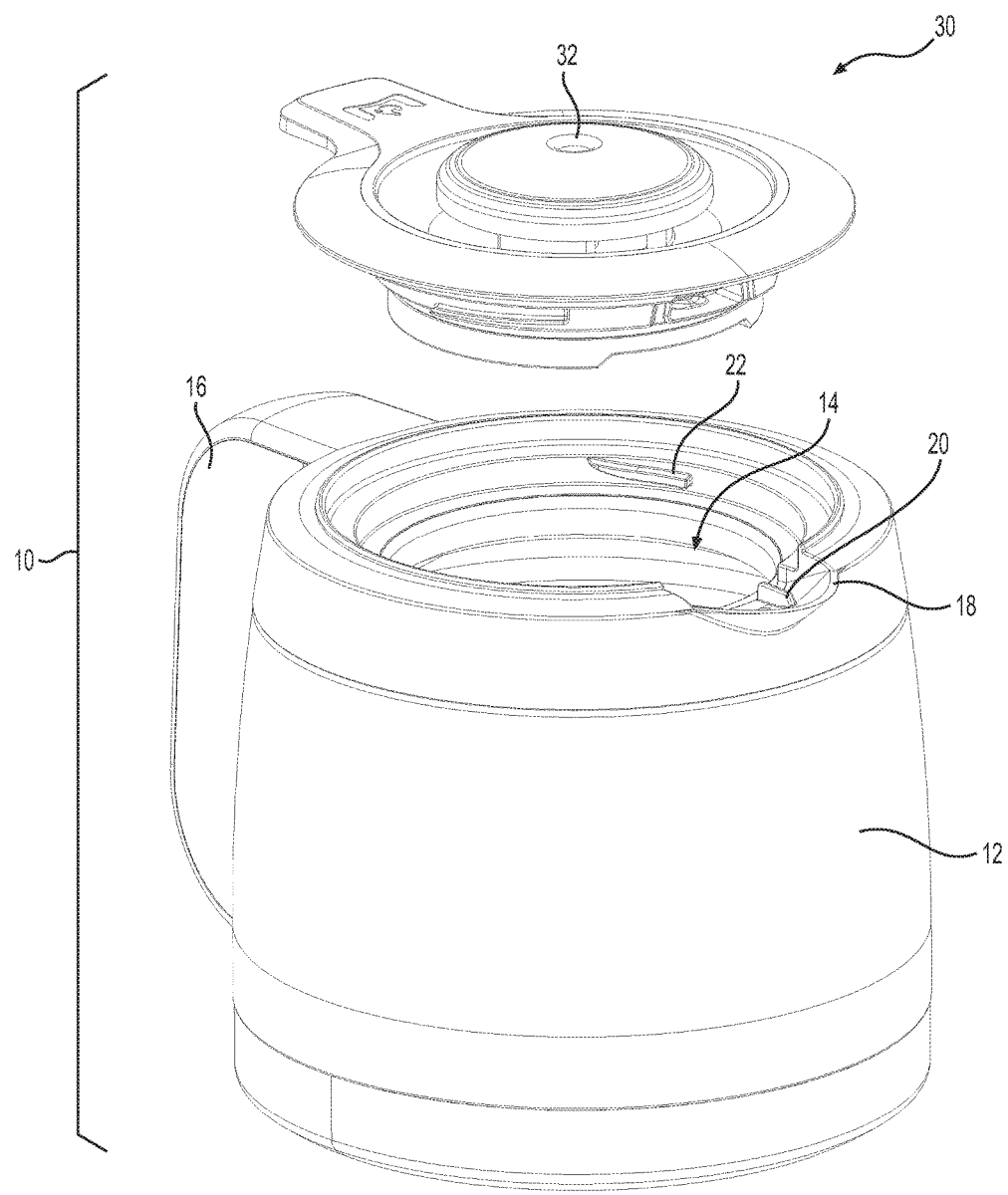
FIG. 2 is a perspective view of the beverage carafe of FIG. 1, with its lid separated.

Certain terminology is used in the following description for convenience only and is not limiting. The words "lower," "bottom," "upper," and "top" designate directions in the drawings to which reference is made. The words "inwardly," "outwardly," "upwardly" and "downwardly" refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Referring to the drawings in detail, wherein like numerals indicate like elements throughout, FIGS. 1-12 illustrate a beverage carafe 10 in accordance with a preferred embodiment of the present disclosure. Such a beverage carafe may be used with, for example, a beverage brewing system such as an automatic drip coffee maker. The beverage carafe 10 of FIGS. 1-12 comprises a vessel portion 12 within which a beverage reservoir or chamber 14 is defined for receiving and holding a beverage. A handle 16 enables a user to lift and tilt the carafe 10 to dispense the beverage from the beverage reservoir 14. The beverage carafe 10 typically comprises a selectively removable lid 30 for selectively closing off an open top end of the reservoir 14. A through hole 32 may be defined in the lid 30 for receiving a beverage being dispensed into the beverage carafe 10 from, e.g., an automatic drip coffee maker. One or more partial threads 22 or complete threads (not illustrated) may be present for selectively securing the lid 30 to the vessel portion 12. A pour spout 18 may project outward from the vessel portion 12 for directing the dispensing beverage into a cup or the like. One or more vertical ribs 20 (one is shown) may project upward from the concave surface of the pour spout 18.

Figure 3:
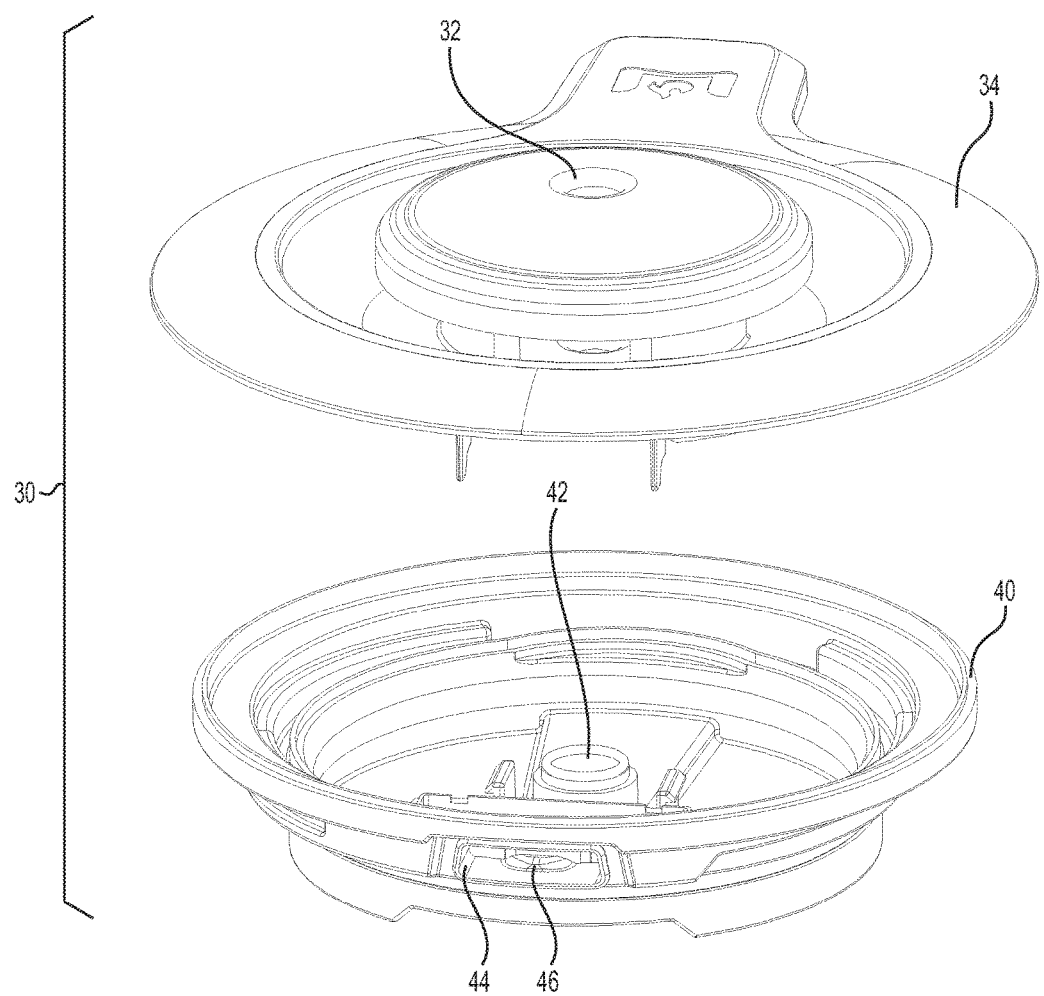
FIG. 3 is an exploded perspective view of the lid of the beverage carafe of FIG. 1.
Figure 4:
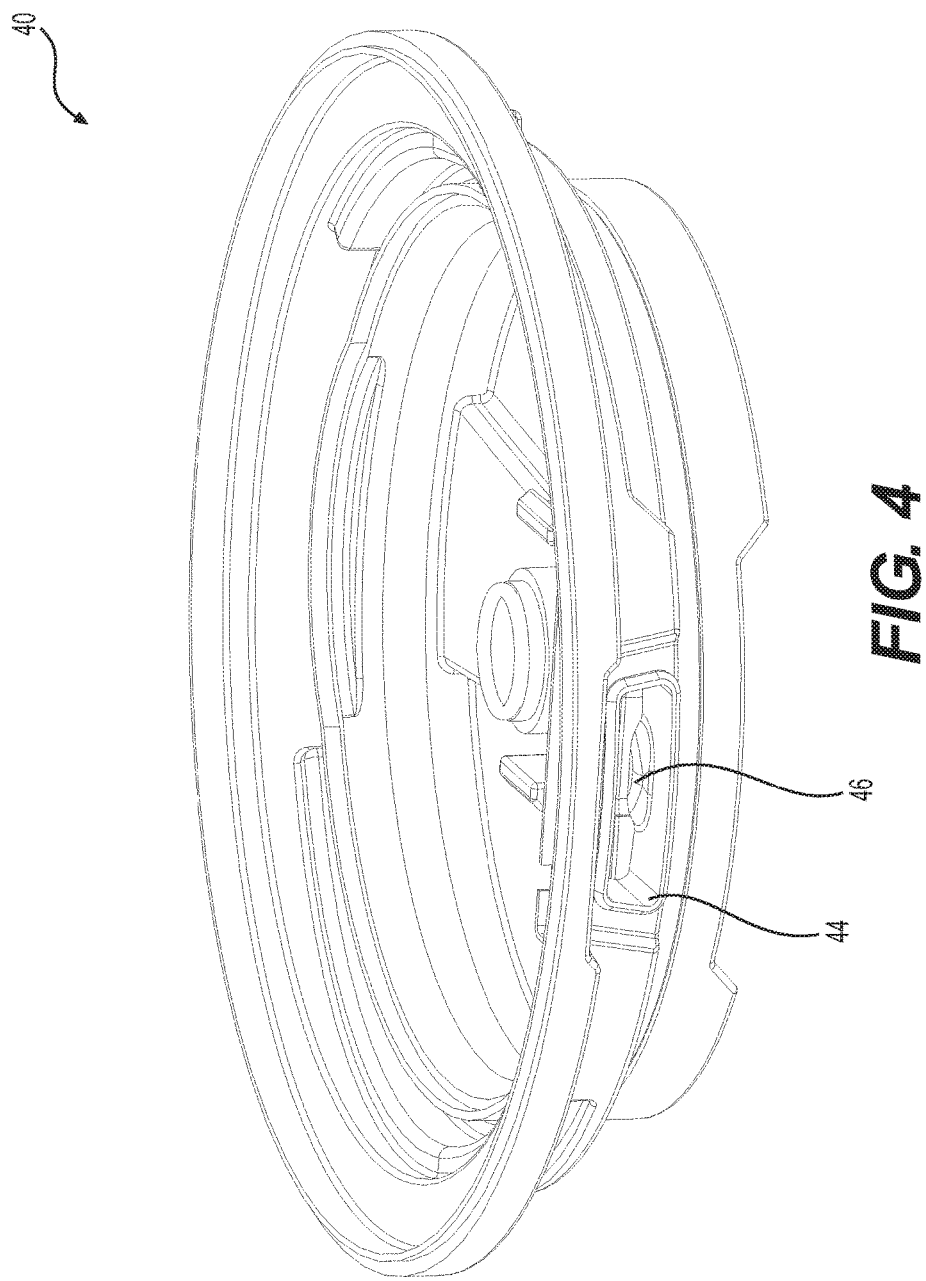
FIG. 4 is a perspective view of a portion of the lid of the beverage carafe of FIG. 1
Figure 5:
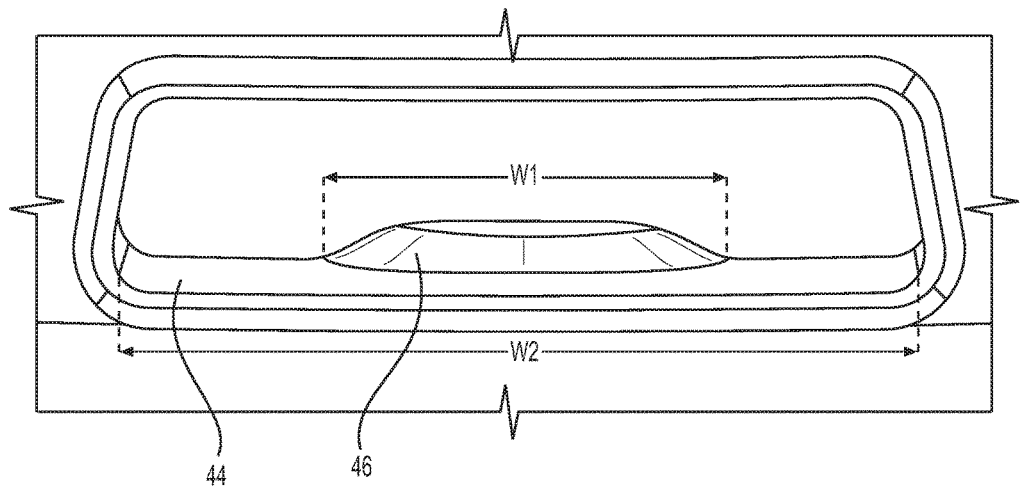
FIG. 5 is a front view of the liquid channel of the beverage carafe of FIG. 1.
Figure 6:
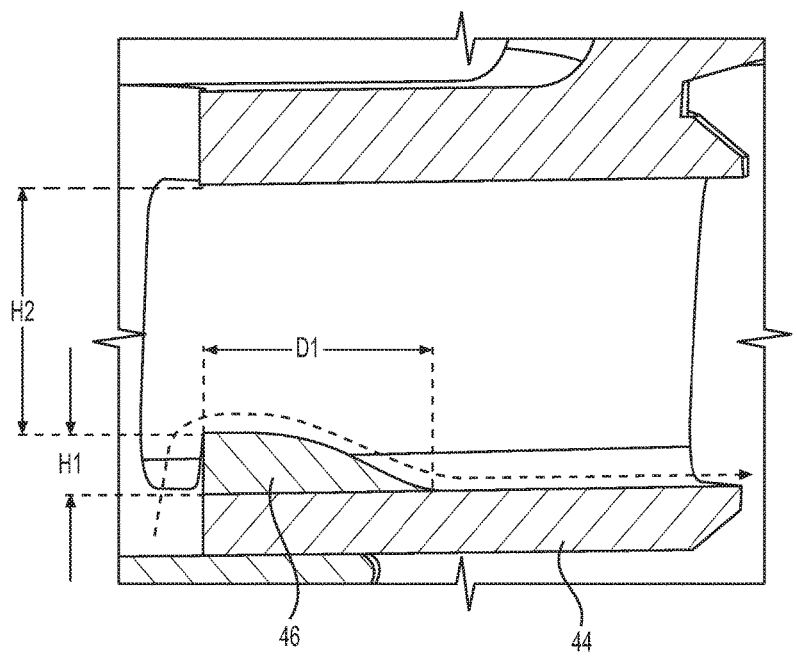
FIG. 6 is a sectional side view of the liquid channel of the beverage carafe of FIG. 1.
Figure 7:
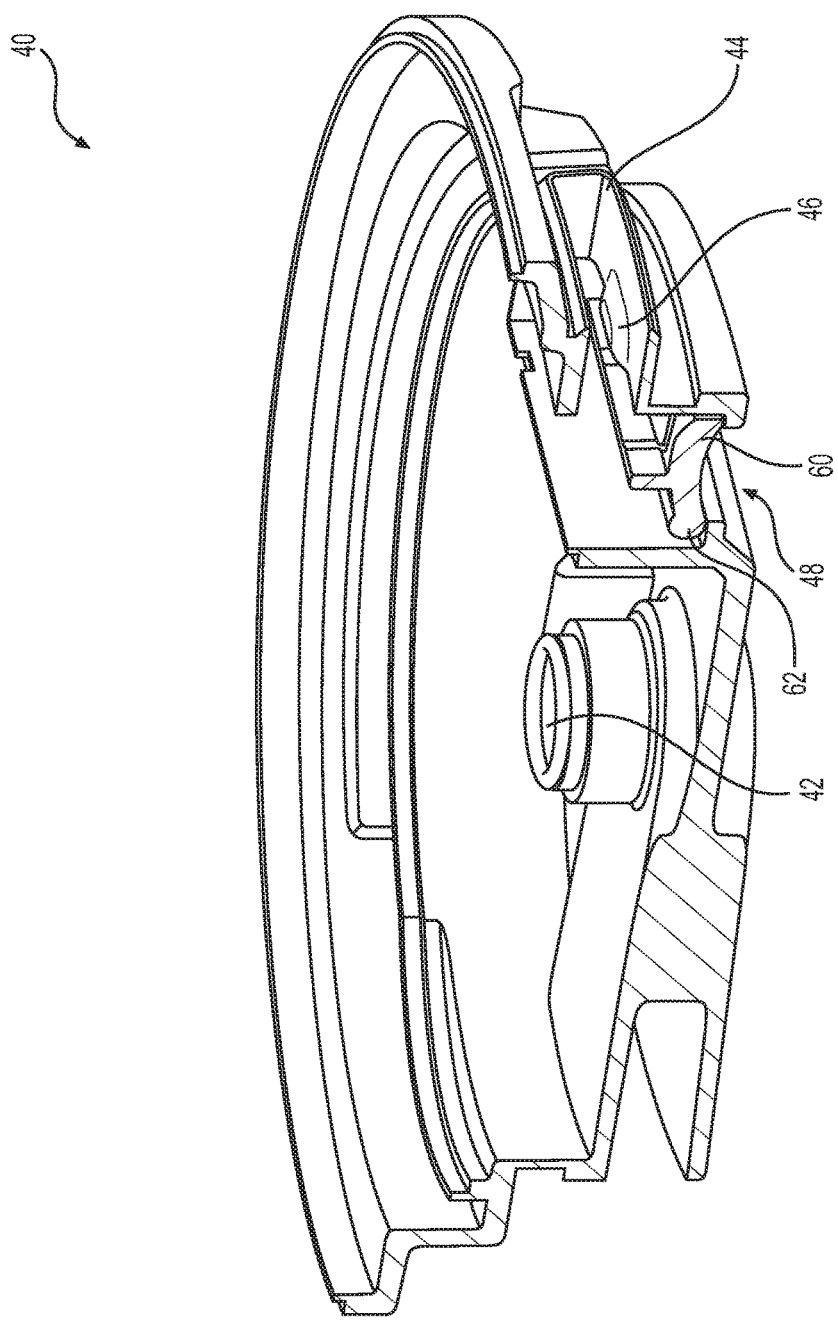
FIGS. 7-9 are sectional perspective views of the portion of the lid of FIG. 4.
Figure 8:
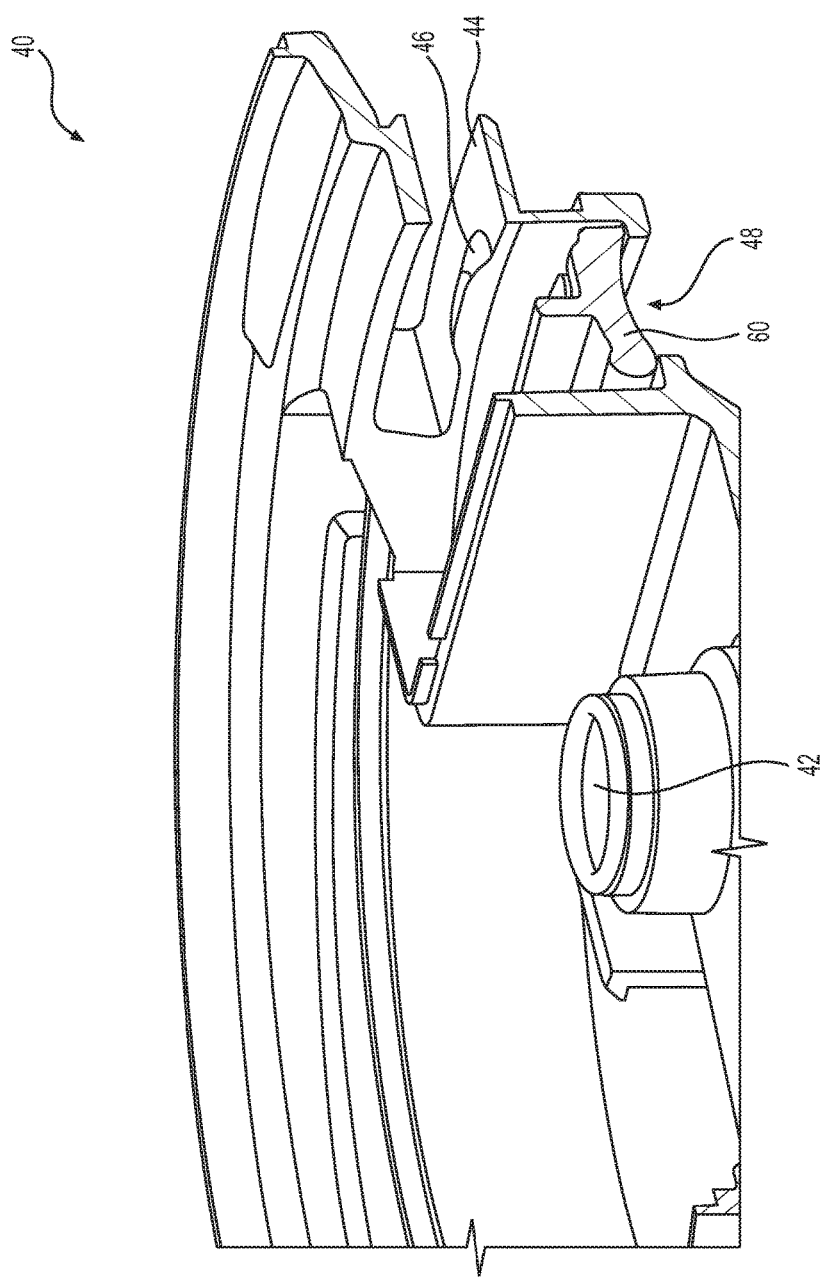
Figure 9:
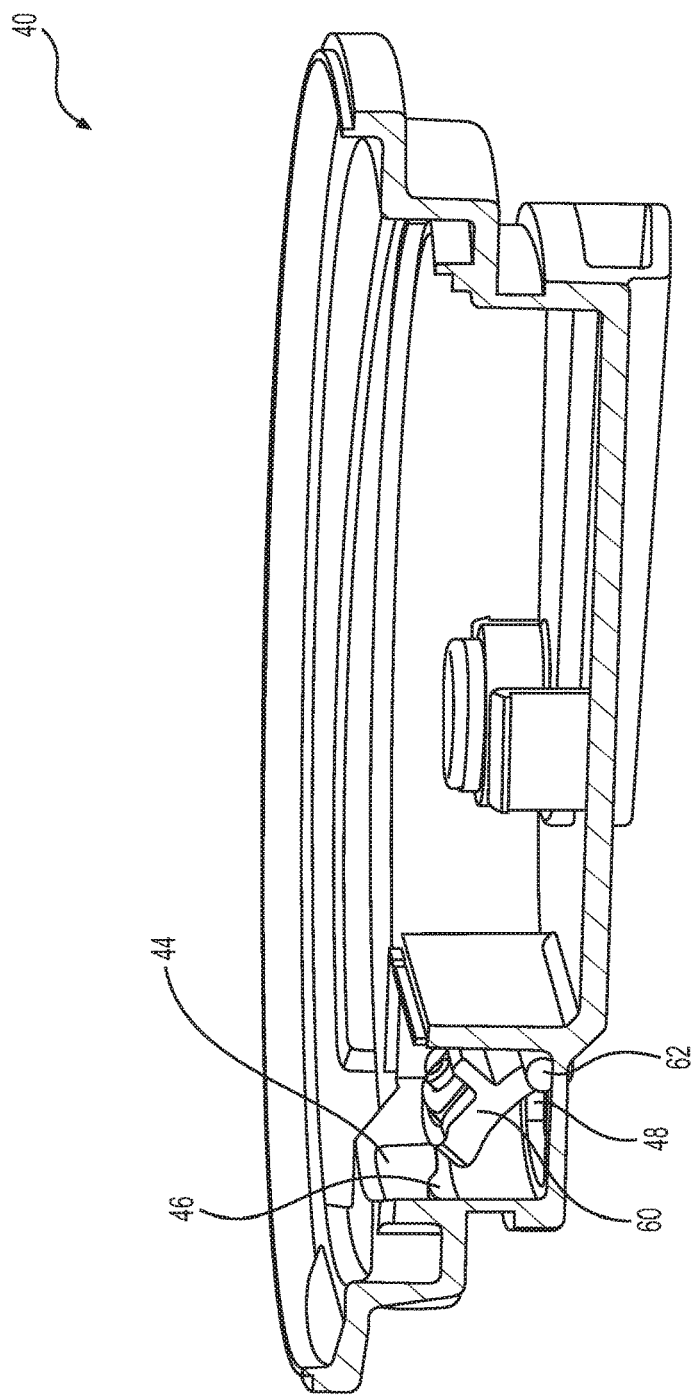
Figure 10:
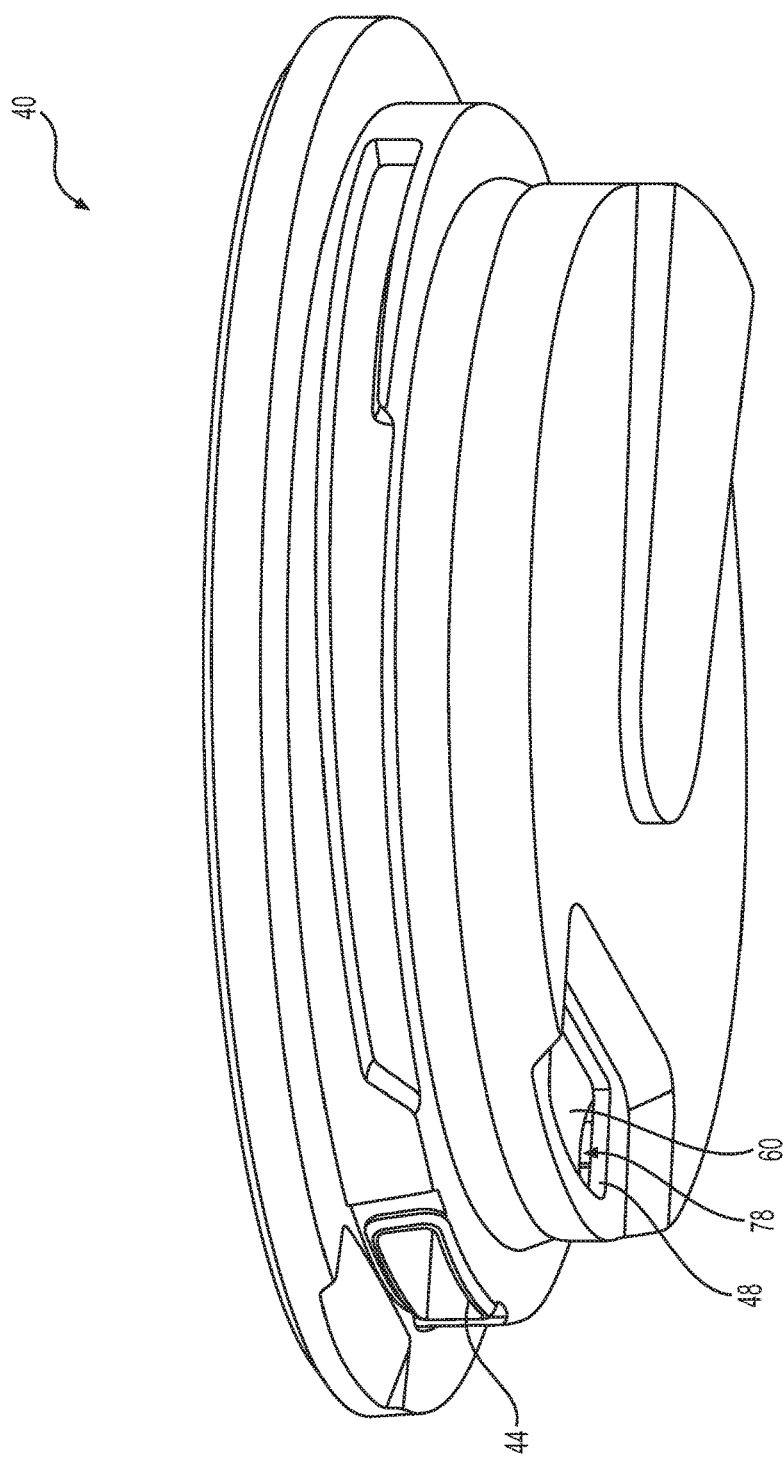
FIG. 10 is a bottom perspective view of the portion of the lid of FIG. 4.
Figure 11:
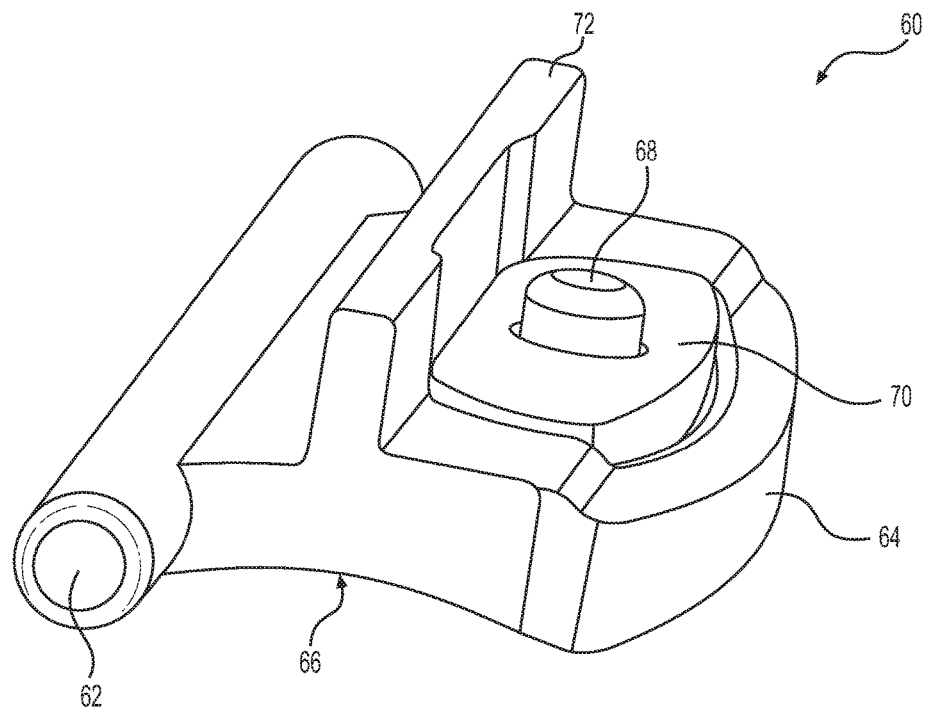
FIG. 11 is a perspective view of the flapper of the beverage carafe of FIG. 1, removed from the beverage carafe.
Figure 12:
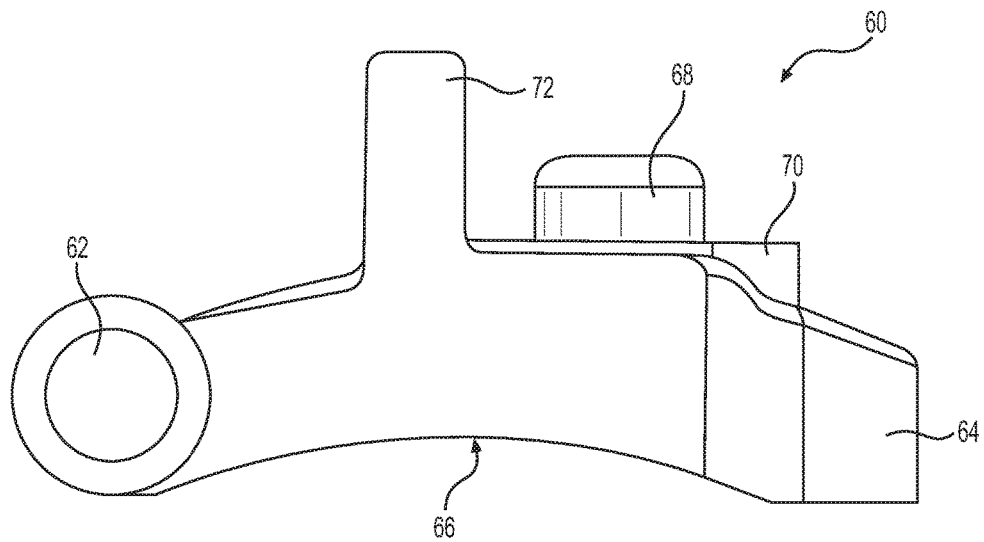
FIG. 12 is a side view of the flapper of the beverage carafe of FIG. 1, removed from the beverage carafe.

As seen in FIG. 3, the lid 30 may comprise a top portion 34 and a collar portion 40 (which would typically not be separable by a user, but are shown separated for clarity). A through hole 42 in the collar portion 40 is aligned with the through hole 32 in the top portion 34 such that the beverage being dispensed into the beverage carafe 10 may flow through the lid 30 into the beverage reservoir 14. A channel 44 is defined in the collar portion 40 of the lid 30. The channel 44 directs a flow of liquid from the reservoir 14 to the pour spout 18 when the carafe 10 is tilted for dispensing the beverage. The channel has a generally rectangular or trapezoidal cross-section (as best seen in FIG. 5). Advantageously, an elongated protrusion 46 projects upward from the floor of the channel 44. The protrusion 46 is transverse to the flow of the beverage through the channel 44. The protrusion 46 has a curved distal face (i.e., the face distal from the reservoir along the flow path of the dispensed beverage) (as best seen in FIG. 6, in which the flow path of the dispensed beverage is shown as a dashed line arrow) and curved opposing sides (as best seen in FIG. 5).

As the dispensed beverage flows over the protrusion 46, a low-pressure zone is created on the distal face to draw the liquid back to the bottom surface or floor of the channel 44, thereby reducing or preventing splashing of the beverage. The size and shape of the protrusion may vary depending on the specific design of the carafe (e.g., the size and shape of the channel, the amount of beverage flow, etc.). Generally, the protrusion should be small enough that the protrusion does not block the outlet flow of the beverage, but large enough to influence the flow and create the desired low-pressure zone. The opposing sides and distal wall are smoothly curved, as abrupt changes in the beverage flow (which may occur if the protrusion is not smooth (especially the distal wall) and/or the protrusion is too tall) may cause separation of the flow and eddy currents that would be counter-productive to reducing splashing. In one exemplary embodiment, the protrusion has a height H1 of about 1 millimeter (mm), a width W1 of about 11 mm (which is about one-half the width W2 of the channel opening), and a depth D1 of about 4 mm (which is about the same as the height H2 of the outlet flow above the protrusion). In at least some embodiments of the present disclosure, it is preferable to have the width W1 of the protrusion equal to about one-half the width W2 of the channel opening and to have the depth D1 of the protrusion equal to about the height H2 of the outlet flow above the protrusion.

A throat 48 (seen in FIGS. 7-10) is defined in the collar portion 40 of the lid 30. The throat 48 is positioned such that the beverage flows from the reservoir 14 through the throat 48 to the channel 44. A flapper 60 pivots between a down position (seen in FIGS. 7, 8 and 10) in which the throat 48 is at least partly closed off and an up position (seen in FIG. 9) for dispensing. The flapper 60 has a hinge end 62 and an opposing curved front end 64 that matches the curvature of the adjacent inner wall of the collar portion 40. The flapper 60 may have a vertical rib 72 that helps to ensure proper installation. The flapper 60 may have a small weight 70 (shown positioned on a vertical post 68) to help bias the flapper closed. The weight 70 may comprise a small piece of metal (e.g., stainless steel) that weights about two grams.

Advantageously, the flapper 60 has a concave bottom surface 66 to direct the flow of the liquid from the reservoir 14 toward the channel 44. As seen in the figures, the curvature is in the direction of the flow of liquid (in other words, the central axis of the curvature is transverse to the flow of liquid) to provide the desired direction of flow. Because the surrounding edges of the throat 48 are flat, the curvature of the bottom surface 66 of the flapper 60 creates opposing vents 78 (only one is visible in FIG. 10) between the concave bottom surface 66 of the flapper 60 and the flat edges of the throat 48 when the flapper 60 is in the down position (seen in FIG. 10). The vents 78 allow air to vent around the sides of the flapper 60 to help prevent the flapper 60 from "burping" during the brew cycle due to pressure caused by the inlet flow of the beverage into the reservoir 14.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

That which is claimed:

1. A beverage carafe comprising:
   a beverage reservoir;
   a channel for directing a flow of liquid from the reservoir when the carafe is tilted for dispensing the liquid, the channel having a floor and an elongated protrusion projecting upward from the floor, the protrusion being transverse to the flow of the liquid through the channel and having a curved distal face and curved sides;
   a throat positioned such that the liquid flows from the reservoir through the throat to the channel;
   a flapper that pivots between a down position in which the throat is at least partly closed off and an up position for dispensing, the flapper having a concave bottom surface to direct the flow of the liquid toward the channel; and
   wherein the throat has opposing flat side edges such that opposing vent openings are defined between the concave bottom surface of the flapper and the flat side edges of the throat when the flapper is in the down position.

2. The beverage carafe of claim 1, further comprising a pour spout;
   wherein the channel directs the flow of the liquid from the reservoir to the pour spout.

3. The beverage carafe of claim 1, further comprising a selectively removable lid for selectively closing off an open top end of the reservoir;
   wherein the channel is defined in the lid.

4. A beverage carafe comprising:
   a beverage reservoir;
   a channel for directing a flow of liquid from the reservoir when the carafe is tilted for dispensing the liquid;
   a throat positioned such that the liquid flows from the reservoir through the throat to the channel; and
   a flapper that pivots between a down position in which the throat is at least partly closed off and an up position for dispensing, the flapper having a concave bottom surface to direct the flow of the liquid toward the channel.

5. The beverage carafe of claim 4, wherein the throat has opposing flat side edges such that opposing vent openings are defined between the concave bottom surface of the flapper and the flat side edges of the throat when the flapper is in the down position.

6. The beverage carafe of claim 4, wherein the channel has a floor and an elongated protrusion projecting upward from the floor, the protrusion being transverse to the flow of the liquid through the channel and having a curved distal face and curved sides.

7. The beverage carafe of claim 4, further comprising a pour spout;
   wherein the channel directs the flow of the liquid from the reservoir to the pour spout.

8. The beverage carafe of claim 4, further comprising a selectively removable lid for selectively closing off an open top end of the reservoir;
   wherein the channel is defined in the lid.

\* \* \* \* \*